United States Patent [19]
Dale et al.

[11] 3,923,682

[45] Dec. 2, 1975

[54] PROCESS FOR MANUFACTURING PHOSPHORS

[75] Inventors: Ernest A. Dale, Hamilton; Leonard V. Dullea, Salem; Martha J. B. Thomas, Winchester, all of Mass.

[73] Assignee: Sylvania Electric Products, Inc., Danvers, Mass.

[22] Filed: Dec. 29, 1969

[21] Appl. No.: 888,876

[52] U.S. Cl....252/301.6 P; 252/301.4 P; 252/301.4 R
[51] Int. Cl.² ............ C09K 11/10; C09K 11/12; C09K 11/24; C09K 11/42; C09K 11/44
[58] Field of Search ....... 252/301.4 P, 301.4, 301.6; 23/51, 1

[56] References Cited
UNITED STATES PATENTS

| | | | |
|---|---|---|---|
| 2,488,733 | 11/1949 | Mckeag et al. | 252/301.4 P |
| 3,030,313 | 4/1962 | Alles | 252/301.4 |
| 3,305,349 | 2/1967 | Bovarnick et al. | 75/.5 |
| 3,378,335 | 4/1968 | Ellis et al. | 252/62.56 |
| 3,538,014 | 11/1970 | Wachtel | 252/301.4 P |
| 3,541,019 | 11/1970 | Glemza et al. | 252/301.6 F |
| 3,586,635 | 6/1971 | Vanik et al. | 252/301.4 F |

*Primary Examiner*—Jack Cooper
*Attorney, Agent, or Firm*—James Theodosopoulos

[57] ABSTRACT

Phosphor raw ingredients are homogeneously dispersed or dissolved in a liquid which is then spray dried to form particles having a predetermined particle size range, each particle containing substantially identical proportions of the raw materials. The particles are then passed through a fluidizing bed within a heated chamber, the chamber being maintained at a temperature high enough to react the particles to form phosphor matrices.

5 Claims, No Drawings

PROCESS FOR MANUFACTURING PHOSPHORS

BACKGROUND OF THE INVENTION

1. Field of the Invention

This invention relates to an improved method for the manufacture of a phosphor matrix and especially to the manufacture of a fluorescent lamp phosphor, such as halophosphate.

2. Description of the Prior Art

Halophosphate phosphors are well known in the prior art and are extensively used in fluorescent lamps. Such phosphors are described in U.S. Pat. No. 2,488,733 issued on Nov. 22, 1949.

Halophosphate phosphors can be represented by the general matrix $3M_3(PO_4)_2 \cdot MH_2$, where M represents either different or identical bivalent metals or mixtures of such metals, for example, calcium, strontium or barium, and H represents a halogen or mixture of halogens, preferably, fluorine, chlorine or bromine.

Previous methods for preparing a halophosphate phosphor matrix involved weighing out the raw materials in fixed proportions and then blending them by dry mechanical mixing or by wet ball milling followed by drying. As pointed out in a co-pending application, Ser. No. 606,159 entitled "Process for Forming Phosphors," filed on Dec. 30, 1966 by Dale et al, such blending methods did not generally produce the desired homogeneity in the phosphor matrix.

In the usual procedure the mixture was then placed in trays or boats and fired at about 800° to 1300°C. in batch furnaces to yield a phosphor. The firing generally lasted about 1 or 2 hours, that length of time necessary to result in substantially complete conversion to the phosphor matrix and eliminate the volatiles in the material.

Such batch firing usually resulted in undesirable agglomeration of the phosphor particles. Since the agglomerated particles were too large to produce an efficient uniform phosphor coating, milling or grinding was necessary to reduce the size of the phosphor particles to a size suitable for a phosphor coating. Consequently, after milling or grinding, the powder would often have to be classified in order to obtain a desired particle size range.

Another disadvantage to the batch method of firing was non-uniformity of rate of heating of the powder within a boat which can cause an undesirable variation of the phosphor composition within a batch.

SUMMARY OF THE INVENTION

In the manufacture of phosphors in accordance with this invention, predetermined quantities of phosphor raw materials are dissolved and/or dispersed in a suitable liquid vehicle, usually water.

Insoluble materials are entered into the liquid vehicle in a sufficiently fine particle size so as to permit the maintenance of a homogeneous dispersion thereof throughout the liquid.

The homogeneous solution/dispersion is then atomized into a spray drier to yield particulate material having a predetermined particle size range, as shown in co-pending application, Ser. No. 606,159. The dried material is then transported by means of a gaseous medium, such as air, into and through a heated fluidizing bed within a chamber, the bed and chamber being maintained at a temperature sufficient to cause the material to chemically react and be converted to a phosphor matrix. During conversion, the particles are in sufficiently continuous motion to prevent substantially any sintering together or agglomeration thereof. The phosphor is then separated from the exhaust and transport gases and is collected in a suitable container.

A separate heat-resistant inert granular material can be used as the fluidizing bed, inert in order to prevent any reaction thereof with the material and gases passing therethrough. Also, the inert material preferably has good heat conductivity in order to provide a substantially uniform temperature throughout the bed. Silicon carbide and aluminum oxide are examples of a suitable bed material.

The grain size of the bed material must be such that, while it is maintained in constant fluidizing motion by the gases flowing therethrough, it is not carried upward and out of the chamber along with the phosphor particles. Thus, the grain size of the bed material must be greater than that of the particles passing therethrough.

Agitation of the hot bed material prevents extended intimate contact between particles passing therethrough and, consequently, any agglomeration thereof. Also, the continuous motion of the particles upward and through the heated chamber prevents the intimate contact necessary to result in agglomeration. The temperature of the fluidizing bed and chamber and the residence time of the particles therein should be sufficient to cause the particles to chemically react and be converted to phosphor matrices.

DESCRIPTION OF THE PREFERRED EMBODIMENTS

Example 1

A solution was prepared by mixing together the following ingredients:

|  | Specific Gravity | Grams of Solution |
| --- | --- | --- |
| Calcium Nitrate Solution | 1.300 | 1,528 |
| Strontium Nitrate Solution | 1.256 | 78,000 |
| Magnesium Nitrate Solution | 1.256 | 6,030 |
| Phosphoric Acid | 1.522 | 11,130 |

To the above solution were added 240 grams of tin oxide powder having a particle size less than 3 microns. Homogeneity of the resultant solution/dispersion was maintained by constant agitation thereof.

The homogeneous solution/dispersion was then atomized and spray dried, as described in Ser. No. 606,159, at a rate of about 270 cc./minute in a stream of air at a temperature of about 400°F. The resultant particles, which at this point were a tin-containing nitrated alkaline earth phosphate, were then pneumatically transported in a stream of hot nitrogen (about 230°F.) into a fluidized bed within a chamber, the bed and chamber being at a temperature of about 1200°C.

The chamber comprised a vertical ceramic tube surrounded by electric heaters. At the lower end of the tube was a silicon carbide porous plate on which was supported a fluidizing bed comprising silicon carbide granules of about 16 mesh. The bed had a diameter of about 12 inches and an at-rest height of about 6 to 8 inches. Fluidizing was accomplished by flowing about 21 cubic feet per minute (cfm) of nitrogen and/or air upward through the porous plate and silicon carbide granules, which increased the height of the bed about 50% and maintained the granules in constant motion. The motion of the granules was generally upward at about the center of the bed and downward near the periphery thereof.

The pneumatically transported particles were introduced through a vertical tube within the chamber into the upper portion of the bed at a point where the motion of the granules was generally downward, so as to distribute said particles throughout the bed. At a transport gas flow rate of 4 cfm, about 30 pounds per hour of material was introduced into the fluidized bed. After flowing throughout the bed, the particles were carried upwards through the chamber by the gas flow and into a cyclone where they were separated from the exhaust gases and collected. The residence time of the particles within the bed and chamber was about 30 to 60 seconds, which was sufficient to cause them to chemically react and form an alkaline earth orthophosphate.

In this particular example, the collected material was not yet a phosphor (that is, capable of fluorescing), since the process had been carried out in a neutral or oxidizing atmosphere, and the tin was not in a reduced state. Therefore, activation was effected by batch firing the material in a reducing atmosphere of 2% hydrogen, 98% nitrogen at a lower temperature. Any agglomeration or sintering together of particles that occurred during this batch firing was considerably less than occurred in prior art batch firing of phosphor raw ingredients, since substantially no reaction byproducts, such as $H_2O$ and $NO_2$, were formed in this firing; also, the firing took place at a lower temperature.

In this example, the tin could have been introduced into the original solution in a solution form itself, instead of as finely divided tin oxide, by first dissolving the tin oxide in hot phosphoric acid.

Example 2

The same ingredients were mixed and processed as in Example 1 with the sole difference that the fluidizing gas was a mixture of 98% nitrogen and 2% hydrogen. Activation, that is, reduction of the tin, occurred within the fluidizing bed and chamber and obviated the need of a second firing.

Example 3

A europium-activated yttrium vanadate phosphor was prepared by dissolving 113 grams of $Y_2O_3$, 117 grams of $NH_4VO_3$, and 8.8 grams of $Eu_2O_3$ in 5000 grams of 70% A.R. grade nitric acid. The solution was diluted with 5000 grams of water and processed as in Example 1, except that the bed temperature was 900°C. instead of 1200°C. The processed material was a phosphor after passage through the fluidized bed and chamber since a reducing atmosphere was not necessary for activation.

Example 4

The following materials were mixed in solution form and processed as in Example 1 to form an antimony-activated calcium halophosphate phosphor:
4.78 moles Ca as $Ca(NO_3)_2$ solution
0.09 moles Sb as $SbCl_3$ solution
1.00 moles F as HF solution
0.04 moles Cd as $Cd(NO_3)_2$ solution
3.00 moles P as $H_3PO_4$ solution This material, also, did not need a subsequent reducing atmosphere firing for activation since an inert atmosphere was satisfactory therefor.

A tin-activated calcium strontium magnesium orthophosphate phosphor, prepared in accordance with this invention, was used in the manufacture of 40 watt fluorescent lamps, which were compared with lamps coated with prior art process phosphor. Optimum lamp phosphor density required only 5.16 grams of the instant phosphor as against 7.5 grams of the prior art phosphor, a significant cost-saving reduction of 31% of phosphor material.

The lumen output of the instant-phosphor lamp at 0 and 100 hours was 2025 and 1962 lumens, respectively, for a maintenance of 96.2%. For the prior-art-phosphor lamp, the same figures were 2031 and 1882 lumens for a maintenance of only 92.7%.

It is felt that the improvements in phosphor density and maintenance of phosphors manufactured in accordance with this invention are due to greater uniformity in the conversion reaction, a more closely controlled particle size distribution and greater homogeneity in the final phosphor.

Although the invention has been particularly described as comprising a fluiding bed of granules separate from the particles passing therethrough, the fluidizing bed may consist of said particles alone without a different species of particles or granules therein. In such a case the reacted particles would not necessarily be carried out through the top of a chamber but could, instead, flow out by gravity through an overflow pipe at the top of the fluidizing bed.

For example, the spray dried particles could be transported to a porous plate through which fluidizing gas is flowing at a rate sufficient to maintain the particles in fluidizing motion but insufficient to carry away any significant number of particles. As more spray dried particles are transported to the porous plate, the height of the fluidized bed builds up until it reaches an overflow pipe, the open end of which is several inches to a foot or more above the porous plate. The fluidized bed, of course, is maintained at the proper temperature to react the particles and convert them to phosphor matrices. The reacted particles at the top of the fluidized bed enter the overflow pipe, are carried away by gravity and are collected as before.

In some cases where the reaction temperature is quite high, say, about 1300°C. and there may be some sintering or slight melting of the particles in the fluidizing bed, the granular type of fluidizing bed is preferable in preventing particle agglomeration and in preventing a buildup of particles on the walls of the fluidizing bed.

We claim:
1. The process of manufacturing an antimony activated calcium halophosphate phosphor comprising the steps of:
   a. preparing a solution containing calcium nitrate, antimony chloride, hydrofluoric acid, cadmium nitrate and phosphoric acid;
   b. atomizing said solution into droplets;
   c. drying said droplets to produce particles having a predetermined particle size range;
   d. transporting said particles into a heated fluidizing bed comprising an inert granular material which is in constant motion during operation, and
   e. heating said particles therein to a temperature sufficient to form a phosphor matrix.

2. The process of claim 1 wherein said particles are pneumatically transported to said fluidizing bed and wherein said bed is fluidized by a separate gas.

3. The process of claim 2 wherein said fluidizing bed comprises an inert heat-resistant granular material having a particle size greater than that of said particles being reacted to form said phosphor matrix.

4. The process of claim 3 including the additional steps of carrying the reacted particles upward from said fluidizing bed by gaseous flow and separating the particles from the gases.

5. The process of claim 3 wherein said particles are introduced into said fluidizing bed at a point where the motion of said granular material is substantially downward.

* * * * *